United States Patent
Smallegange et al.

(10) Patent No.: US 10,189,245 B2
(45) Date of Patent: Jan. 29, 2019

(54) METHOD AND AN ASSEMBLY FOR SUBLIMATION TRANSFER PRINTING

(71) Applicant: SPGPrints B.V., Boxmeer (NL)

(72) Inventors: Martin Jan Smallegange, Beuningen (NL); Sjoerd Peter Van De Geijn, Boxmeer (NL)

(73) Assignee: SPGPrints B.V., Boxmeer (NL)

( * ) Notice: Subject to any disclaimer, the term of this patent is extended or adjusted under 35 U.S.C. 154(b) by 0 days.

(21) Appl. No.: 15/738,187

(22) PCT Filed: Jul. 8, 2016

(86) PCT No.: PCT/NL2016/050505
§ 371 (c)(1),
(2) Date: Dec. 20, 2017

(87) PCT Pub. No.: WO2017/007327
PCT Pub. Date: Jan. 12, 2017

(65) Prior Publication Data
US 2018/0272691 A1    Sep. 27, 2018

(30) Foreign Application Priority Data
Jul. 9, 2015  (IT) .......................... 102015000032644

(51) Int. Cl.
*B41J 2/00*      (2006.01)
*B41M 5/03*    (2006.01)
(Continued)

(52) U.S. Cl.
CPC .................. *B41J 2/01* (2013.01); *B41M 5/03* (2013.01); *C09D 11/30* (2013.01); *D06P 5/004* (2013.01); *B41J 2002/012* (2013.01)

(58) Field of Classification Search
CPC . B41J 2/01; B41M 5/03; B41M 5/035; C09D 11/30; D06P 5/004
See application file for complete search history.

(56) References Cited

U.S. PATENT DOCUMENTS 4,294,637 A * 10/1981 Rump ..................... B41F 16/02
101/470
4,640,191 A *  2/1987 Bradley .................. B41F 16/02
101/470
(Continued)

FOREIGN PATENT DOCUMENTS

EP        1591258 A1   11/2005
EP        2767398 A1    8/2014
(Continued)

*Primary Examiner* — Jason S Uhlenhake
(74) *Attorney, Agent, or Firm* — Hoffmann & Baron, LLP

(57) ABSTRACT

A printing assembly for sublimation transfer printing includes: a feed mechanism by which a web of carrier is fed in a machine direction to a printer; the printer including: a carrier transport unit, controllably movable along a machine direction; digital printing stations for the deposition of sublimation ink or inks onto the carrier; a feed mechanism for the substrate material to be printed; a heat press for transferring the sublimation ink or inks onto the substrate material; and an outlet for the substrate material and used carrier, where the printing stations extend transversally to the machine direction and cover the width of carrier. A method for sublimation transfer printing may use the printing assembly.

16 Claims, 2 Drawing Sheets

(51) Int. Cl.
    *C09D 11/30*    (2014.01)
    *D06P 5/00*     (2006.01)
    *B41J 2/01*     (2006.01)
    *D06P 5/28*     (2006.01)

(56) References Cited

U.S. PATENT DOCUMENTS

| | | |
|---|---|---|
| 4,731,355 A | 3/1988 | Iwasaki et al. |
| 4,962,080 A | 10/1990 | Watanabe |
| 4,997,807 A | 3/1991 | Mukoyoshi et al. |
| 5,268,347 A | 12/1993 | Okumura et al. |
| 5,640,180 A | 6/1997 | Hale et al. |
| 6,460,992 B1 | 10/2002 | Boyd et al. |
| 6,902,779 B1 | 6/2005 | de Visser et al. |
| 2008/0229962 A1 | 9/2008 | Shedd et al. |
| 2013/0235116 A1 | 9/2013 | Takemoto |
| 2014/0225966 A1* | 8/2014 | Izawa ................ B41J 2/01 347/103 |
| 2015/0165758 A1 | 6/2015 | Sambhy et al. |

FOREIGN PATENT DOCUMENTS

| | | |
|---|---|---|
| GB | 1354890 A | 5/1974 |
| WO | 2005/028731 A1 | 3/2005 |

\* cited by examiner

METHOD AND AN ASSEMBLY FOR SUBLIMATION TRANSFER PRINTING

CROSS-REFERENCE TO RELATED APPLICATIONS

This application is the National Stage of International Application No. PCT/NL2016/050505 filed Jul. 8, 2016, which claims the benefit of Italian Application No. IT 102015000032644, filed Jul. 9, 2015, the contents of which is incorporated by reference herein.

FIELD OF THE INVENTION

This invention concerns a method and an assembly for sublimation transfer printing, useful in wide-array printing. More in particular, this invention concerns an assembly comprising a printer with single pass digital printing stations for applying sublimation ink on a carrier (e.g., transfer paper) and a heat press (typically a calender) to transfer the ink to a substrate material (e.g., a polyester fabric).

BACKGROUND OF THE INVENTION

A sublimation transfer printer is a computer printer which employs a printing process that uses heat to transfer a sublimation ink from a carrier onto substrate materials such as a plastic, card, paper, or fabric. Dye sublimation inks, also known as disperse dye inks, are made of high purity and ultra-fine particle disperse dyes that can change from solid to gas without entering liquid phase. Sublimation printing is a process carried out more and more by inkjet printers with sublimation inks and sublimation papers. In sublimation transfer printing, sublimation inks may be deposited onto sheets or rolls of "transfer" paper as carrier, through a piezoelectric print head. After the ink is deposited in the form of a negative image the transfer paper is placed on a heat press along with the substrate material (fabric). The heat press is then used to transfer the image onto the substrate material. Recommended transfer temperatures range from 180-230° C., with a transfer time of 30-60 seconds. When using thin fabrics as substrate, the temperature may be kept as low as 170° C.

As polyesters fibers and the weaving are constantly improved to match the comfort of the cotton fiber, the use of polyester in fast fashion and sportswear is rapidly growing. Shirts like the Nike Pro Core Compression consists of 90% polyester and 10% elasthan, and removes sweat from the body and keeps the runner cool. This reduces the need for cotton. Polyester fabric is printed mostly with sublimation ink. The great benefit of sublimation ink is the fact that the colorants will bond with the fiber during sublimation or fixation. The colors are 'inside' the fabric rather than on the surface as would be the case with screen printing and direct printing methods of reactive and acid dyes. Thus, the end result of the sublimation process is a nearly permanent, high resolution, full color print, which may be washed or steamed to remove any ink or other process residues. Separate fixation or finishing after the transfer step will not be required.

The main issue with sublimation transfer printing, however, is speed. Also for larger productions (greater surface or continuous printing) existing sublimation transfer printers are less suitable because of positioning errors and print to print color errors (which are hard to predict during printing as colors will only appear at the right shade after fixation). For large production cycles, using a multitude of printers and calenders may be an option. However, printer to printer and calender to calender output varies as the performance and quality of these devices vary. The inventors set out to solve these problems related to speed, or caused by a production set-up with a multitude of printers and calenders.

SUMMARY OF THE INVENTION

The invention therefore provides a method for sublimation transfer printing comprising in sequence the continuous steps of:
  feeding a web of carrier (1) from a feed mechanism (2) in a machine direction to a carrier transport unit (3) of a sublimation transfer printer (4) provided with multiple digital printing stations (5),
  synchronizing the speed of carrier (1) with the movement of said transport unit (3)
  positioning carrier (1) on said transport unit (3);
  depositing sublimation ink or inks (6) onto carrier (1) whilst synchronizing the speed of carrier (1) with the deposition of the sublimation ink or inks (6);
  removing carrier (1) from transport unit (3) and passing carrier (1) with deposited sublimation ink or inks (6) together with a web of substrate material (7) to be printed from a feed mechanism (8) through a heat press (9) at sublimation conditions,
  transferring the sublimation ink or inks onto the substrate material (7), and
  collecting the printed substrate material (7) and used carrier (1) from outlet (10)
wherein the digital printing stations (5) extend transversally to the machine direction and cover the width of carrier (1).

Also provided is an assembly comprising a sublimation transfer printer (4) that ensures high productivity whilst maintaining high quality. The assembly according to this invention comprises:
  a feed mechanism (2) by which a web of carrier (1) is fed in a machine direction to a printer (4);
  the printer (4) comprising:
    a carrier transport unit (3), controllably movable along a machine direction;
    digital printing stations (5) for the deposition of sublimation ink or inks (6) onto the carrier (1);
  a feed mechanism (8) for the substrate material (7) to be printed;
  a heat press (9) for transferring the sublimation ink or inks (6) onto the substrate material (7); and
  an outlet (10) for the printed substrate material (7) and used carrier (1),
wherein the printing stations (5) extend transversally to the machine direction and cover the width of carrier (1).

DETAILED DESCRIPTION OF THE INVENTION

Figure 1:
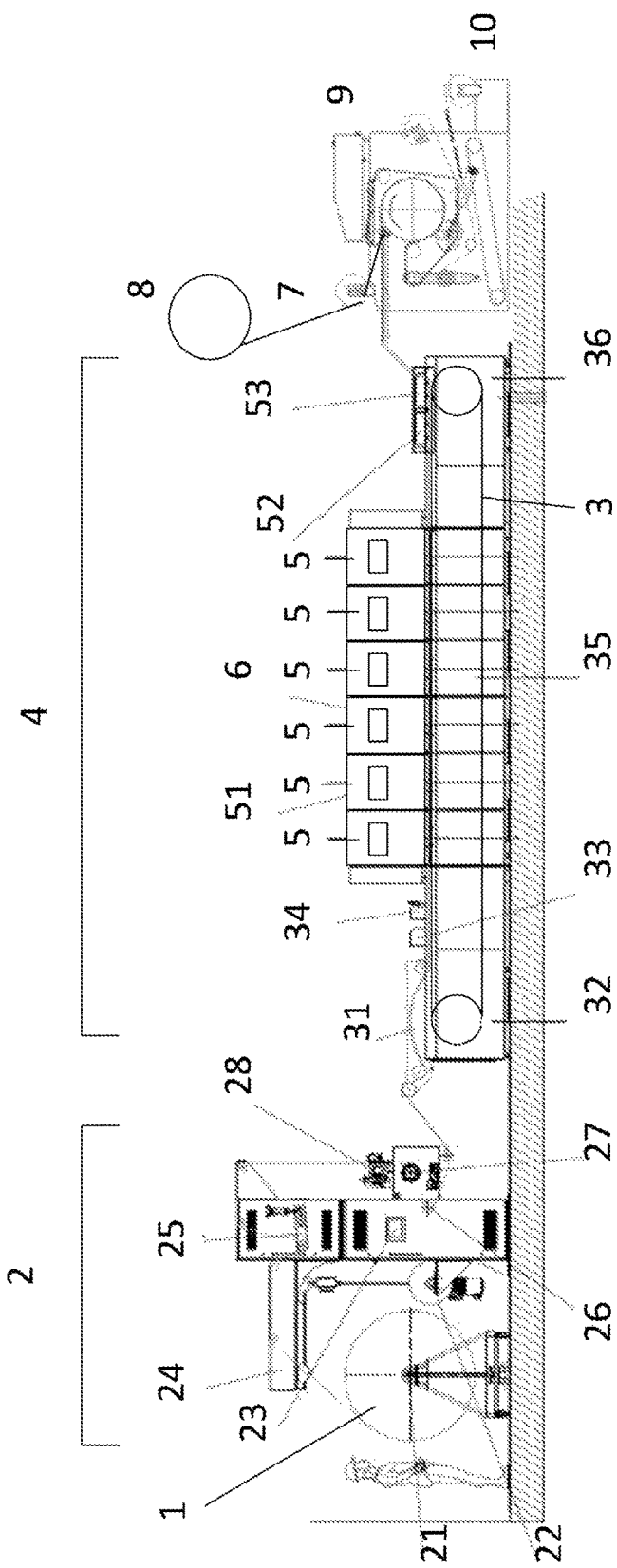
FIG. 1 is a schematic drawing of the preferred embodiment of a printing assembly.

FIG. 1 is a schematic drawing of the preferred embodiment of a printing assembly. Illustrated here is the assembly of a sublimation transfer printer and an in-line calender as heat press (9). A web of transfer paper is used as carrier (1). A conveyer belt with an adhesive layer (not separately shown) is used as transport unit (3), hence the use of heating units (31) and (32), and pressure roller (33). For optimal control, the printer assembly has optional but preferred control mechanisms for synchronizing and positioning the transfer paper and controlling the process (e.g., synchronizers, positioners and process controlers). The printing stations (5) are full-width. Here 6 printing stations are shown. With an arrow is indicated that ink (6) is inside. Not visible in FIG. 1 are the multiple print heads, electronics, and other equipment necessary for the deposition of sublimation ink or inks onto the transfer paper, nor the support bars transverse to the machine direction. The conveyer belt is provided with an adhesive layer, not shown in the Figure. The feed mechanism (8) for the substrate material (7) is schematically represented. Generally this unit, e.g., a feeder, will have similar means to control the speed and straighten the web of substrate material as is used for the web of carrier. A washing station is optional and hence not shown in FIG. 1.

In FIG. 1, (1) is the carrier, here a web of transfer paper;

(2) is the feed mechanism, comprising (21) a center driven unwinder big roll, (22), a center driven unwinder small roll; (23) a control panel; (24) the infeed unit; (25) a dancing roller for synchronization of speed and tension by the unwinder(s); (26) a load cell for synchronization by a guiding unit; (27) the guiding unit; (28) a pneumatic edge spreading unit;

(3) is the carrier transport unit, here a conveyer belt with adhesive layer, comprising (31) a heating unit for the transfer paper (1); (32) a heating unit (e.g., heater) for the conveyer belt; (33) a pressure roller (to interact with the adhesive layer); and (34) laser units to check whether the transfer paper is firmly attached to the conveyer belt; (35) support unit comprising the conveyer belt (3); and (36) conveyer belt washing unit ("washer");

(4) is the printer, comprising (41) digital control screen to control the inkjet printing and (42) line control screen to control the infeed unit (1), and the movement speeds;

(5) are the printing stations (6 in total) extending transversally over the width of the transfer paper; which are controlled by (51) control panel for each printing station;

(6) is an indication of ink inside each printing station;

(7) is the substrate material (e.g., polyester fabric);

(8) is the feed mechanism (e.g., feeder) for the substrate material;

(9) is the heat press, here shown as calender, and

(10) is the outlet, here shown as a winder, but may also be equipped with a plaiter for the printed substrate material and a winder for the used carrier.

Figure 2:
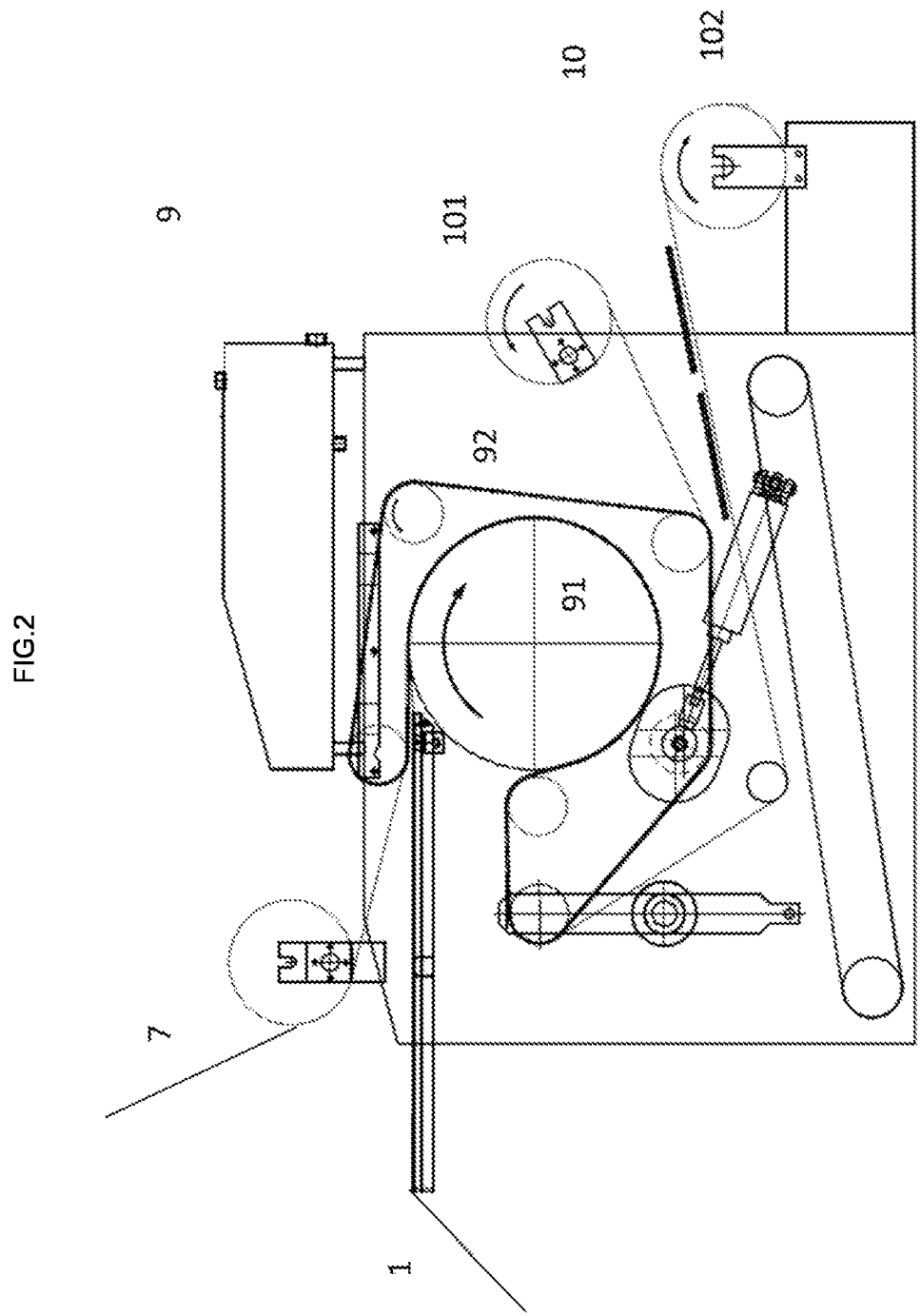
FIG. 2 is a schematic drawing of a detail of the preferred embodiment of a printing assembly.

FIG. 2 is a schematic drawing of a detail of the preferred embodiment of a printing assembly. Illustrated here is the heat press (9) in the form of a calender with a heated drum (91), blanket (92) to position the printed carrier (1) and substrate material (7) entering the press. Also illustrated is the outlet (10) in the form of a winder with collector for the printed substrate material (101) and collector for the used carrier (102).

Drop on demand inkjet printing with a piezoelectric print head is a well-known technique. A pump directs liquid ink from a reservoir (which may be separate or mounted onto the print head) through a print head with piezoelectric-activated reservoir and a microscopic nozzle. When a voltage is applied, the piezoelectric material changes shape, generating a pressure pulse which forces a droplet of ink from the nozzle. A drop on demand process uses software that directs the print heads to apply between zero up to even eight droplets of ink per dot, only where needed. In Continuous Flow Ink Jet, the ink droplets are constantly generated, subjected to an electrostatic field created by a charging electrode—close to the nozzle—as they form. The field varies according to the degree of drop deflection desired. This results in a controlled, variable electrostatic charge on each droplet. The charged droplets pass through another electrostatic field and are directed (deflected) by electrostatic deflection plates to print on the receptor material (substrate), or allowed to continue on (undeflected) to a collection gutter for re-use. The more highly charged droplets are deflected to a greater degree. Only a small fraction of the droplets is used to print, the majority being recycled.

Due to their flexibility and relative simplicity, drop-on-demand piezoelectric print heads are preferred.

Most piezoelectric print heads can be used for sublimation transfer printing. Manufacturers of industrial digital inkjet print heads include Fujifilm, Epson, XAAR, Kyocera, HP, Konica Minolta, and many, many others. Suitable print heads include Epson DX4/5, XAAR1002, Konica Minolta KM512, Seiko SPT510, Ricoh Gen 4 or Gen 5, Fujifilm Dimatix SG1024 or Samba.

The current invention is a successful adaption of single pass printers that are used for continuous direct inkjet printing on textile. There are nowadays two types of inkjet printing systems: multi pass or scan printing versus single-pass printing. In scan printing, a print head carriage reciprocates in the sub-scanning direction (laterally in respect of the print media), making several passes to complete the image printing process. In single-pass printing, the print head carriage remains in a fixed position and completes image printing in a single pass while the print material is conveyed underneath. Due to their high-speed printing capability, single-pass systems are coming into use in the field of industrial printing where high productivity is required. (cf. http://www.konicaminolta.com/inkjet/technology/technology.html)

With single pass printing, it is possible to achieve a printing speed that equals the speed of fast calenders, with a process speed of over 11 m/min, while maintaining a constant (transfer) time of 30-60 seconds. Single pass has the advantage of constant color quality, excellent registration, and excellent positioning in-line fixation, with the further advantage of direct feed-back to the printer in respect of the output colors.

Examples of such single pass printers include the "pattern printing apparatus" from GB1354890. In the words of this patent, the printer is adapted to print by depositing small drops of printing liquid in accordance with a pattern information signal, on a surface to be printed during relative movement between the apparatus and the said surface, comprising a row extending transversely to said direction of relative movement of printing guns, each gun having an orifice, printing liquid supply means for supplying printing liquid under pressure to the orifice to form a jet of printing liquid directed towards the location in the apparatus of the said surface, means for imparting regularly spaced variations in the cross-section of the jet to stimulate drop formation, charge electrode means located adjacent the position in the jet path of drop separation to effect charging of drops formed in the jet path, drop deflection means for providing a substantially constant electrostatic field through which pass the drops formed in the jet path thereby to deflect electrically charged drops to an extent dependent upon the charge levels on the drops, and a drop intercepting means for intercepting uncharged drops. The printing guns are arranged so that the drops deposited from the different guns are enabled to combine to form a continuous pattern which may cover the whole surface. It also includes the continuous inkjet printer sold under the trademark Osiris® which was developed already in 2005.

In single pass printers, the printing stations thereof are mounted on frame beams in transverse direction (generally perpendicular) to the machine direction of the fabric to be printed. EP1591258A1 discloses an apparatus for printing a web of textile. Amongst other characteristics, the apparatus comprises an endless conveyer belt provided with an adhesive layer as supporting means, supply and feed means, printing means for printing in a number of colors, digital control means, and discharge and storage means with drying means. Specifically, the printing means comprise a number of frame beams extending in transverse direction above the upper active part of the conveyer belt at determined mutual longitudinal distances along the direction of transport, each of which frame beams carries an array of inkjet heads and each of which is immobile during operation relative to the plane defined by the upper active part.

WO2005028731A1 discloses a method for digitally upgrading a textile article using a textile upgrading device. The device comprises a number of nozzles for applying one or more substances to the textile, in addition to transport means for transporting the textile along the nozzles. The nozzles are ordered in a number of successively placed rows extending transversely of the transporting direction of the textile article. The method comprises the steps of: guiding the textile article along a first row of nozzles; performing with the first row of nozzles one of the operations of painting, coating or finishing of the textile article carried there along; subsequently guiding the textile along a second row of nozzles; and performing with the second row of nozzles another of the operations of painting, coating or finishing of the textile article carried there along.

In EP2767398 a transfer toner printer device is described, which may have fixed line heads under which a transfer belt passes. However, in this case charged toner particles are positioned directly on the transfer belt, transferred by electrophoresis towards a pressure roller. This is therefore an entirely different manner of printing from injet printing with an inline transfer unit. Unlike for instance the low energy heat activated transfer printing process of U.S. Pat. No. 5,640,180, which describes a nowadays conventional manner of transfer printing using an intermediate transfer sheet.

In none of the above references single pass sublimation printing with the use of transfer paper is discussed or suggested. Thus, the method of using single pass printers, adapted to print a negative image on transfer paper and transferring the image with a heat press (calender) onto a substrate (e.g., polyester fabric) is new.

The method of the present invention involves the steps of feeding a web of carrier (1). Carrier (1) is preferably transfer paper, as discussed below. Preferably carrier (1) is fed in a manner such that wrinkling, tearing, misplacements, etc. does not happen. For this guides and control rolls and the like may be used. Likewise, the speed is synchronized with that of the transport unit (3), typically a conveyer belt. The carrier is positioned on the transport unit (3). This should be done accurately, to avoid misprints. Controls may be included in the method to ensure accuracy. Moreover, the transport unit (3) is preferably equipped with support means to avoid displacement in the subsequent steps.

The transport unit (3) transports carrier (1) to the printing stations (5). Here sublimation ink or inks (6) is or are deposited onto the carrier (1). This is done in a controlled manner, wherein the speed of the transport unit (3) is synchronized with the printing stations (5). Preferably a printer is used having various control mechanisms and panels (e.g., "controllers").

Next, the carrier (1), with deposited sublimation ink or inks (6) is taken from the transport unit (3) and passed together with a web of substrate material (7) to be printed, e.g., a polyester fabric, to a heat press (9), typically a calender.

Here the sublimation ink or inks (6) are transferred at appropriate conditions to the substrate material. This is done preferably at a temperature in the range of 170-230° C., preferably at a transfer time of 30-60 seconds.

The result of this method is web of printed substrate material (7), which is separated from the carrier. The printed substrate material may be collected at an outlet (10), e.g. on a roll or with use of a plaiter, or first washed, if so desired. Here, too, the used carrier (1) is collected.

Although in the present specification reference is made to a carrier (1) for transfer printing, which therefore includes webs of various carrier materials, the current invention is particularly suitable for transfer paper.

Generally, in multicolor wide-array printing (width of more than 1 meter), relatively thick paper must be used to provide accuracy. However, with the current method and apparatus, through the use a transport unit (2) such is no longer required. Thus, the paper may be relatively thin and therefore cheap. As a result, transfer paper for single use only may be used, which is to be preferred as discussed hereafter.

For wide-array printing, transfer paper is more than 1 meters wide. The transfer paper may be over 3.25 meters wide. Preferably it is from 1.60 to 3.25 meters wide. The weight may vary from 35 to 115 g/m². As the cost of the paper represent a high percentage of the total cost of the product, the lighter papers are preferred. Benefit of the present invention is that such lighter papers may now be used.

Various publications describing transfer paper for use in sublimation printing include, for example, US20080229962, U.S. Pat. Nos. 6,902,779, 5,268,347, 4,997,807, 4,962,080, and 4,731,355.

As described in the above publications, transfer paper may be treated to prevent the sublimation ink, in particular water based ink, to penetrate the paper too much and also to make it more dimensionally stable. Treatment of the paper may be especially desirable when using a single pass printer where no drying between printing stations is present and printing stations are positioned close to each other. For instance, during the manufacturing of the paper, resins, waxes or synthetic sizes may be added to modify water contact angles and control water absorbency. Preferably, the paper absorbs the water or solvent of the ink, but leaves the dye and binder components of the sublimation ink in the top of the paper.

Transfer paper for multiple use may suffer from staining and ghosting, which will appear in case the paper is rolled up immediately after printing and drying, and stored for later use. Advantageously, treatment of the back of the transfer paper used in the method of the invention is not required, as such problems does not occur in single use. Avoiding treatment of the back of transfer paper reduces the overall cost of the transfer paper, which is a great benefit.

In the method of the present invention, preferably a water-based sublimation ink is used. Sublimation inks are well-known. There are two types of sublimation inks available in the market. The most popular one is aqueous dye sublimation ink, which is often used in both desktop and large format printers. The other one is solvent dye sublimation ink that can be used in e.g. XAAR, Spectra and Konica print head wide format printers. Inks preferably have a viscosity ranging from 1 up to at least 12 mPa s (Cps), and thus allowing the speed of printing to match the speed of the transfer paper. Moreover, they preferably have good color saturation and high fastness.

In sublimation transfer printing four, six or more colors may be used, but also less. Particularly preferred water based sublimation inks include disperse dyes, binders to assist the transfer and fixation, water, dispersing agents, surfactants, humectants and biocides. Examples of low viscous water based inks for light weighted or low coated papers are the Kiian Digistar HI-PRO ink and the higher viscous ink Digitar K-ONE.

Preferably, in the method according to the present invention, the sublimation ink is deposited by drop on demand piezoelectric printing. This may be done with the print heads defined herein before. In the printer according to the present invention, print heads designed for solvent based or preferably water-based sublimation inks for industrial high speed and high volume sublimation printing are preferred.

The method according to the invention may be used for many substrate materials. Moreover, the method of the invention can be used for the printing of e.g., garments, sportswear, curtains, bedcovers and non-woven fabrics. The sublimation transfer printing method of the invention is particularly suitable for polyester fabrics and fabrics of polyacetal, polyamide, triacetate and acrylics. Cellulosic materials like cotton and viscose are less suitable; generally they are only weakly colored with disperse dyes. When used at a low percentage, e.g. at 20%, in a blend this can be acceptable. Chemical modification of cotton to make it printable with sublimation disperse dye is possible to some extent, but these treatments, like alkylation can damage the cotton fiber and let it lose its typical cotton properties. A pretreatment with a hydroxymethylmelamine used to be an option, but as formaldehyde is generated during the transfer in the calender, this is no longer an option under the REACh legislation. The method wherein a web of polyester fabric is used as substrate material (7) is therefore preferred.

Of particular interest for the method of sublimation transfer printing according to the present invention is the use of a single pass printer introduced by SPGprints under the trademark PIKE®. This printer is based on a full-width array of specially modified Fujifilm Samba print heads. The heads are incorporated in a highly accurate but user-friendly print-bar technology, called 'Archer®'. This print-bar technology comprises the steps of:
 providing a support bar having a plurality of primary mounting positions;
 providing a plurality of exchangeable print heads, in which each print head has a plurality of inkjet nozzles, and
 mounting the print heads to the support bar such that they are releasable, which process includes an alignment finishing process.

This new 'Archer®' technology can jet accurately across a distance much greater than other heads that are widely used in current digital-textile applications can. The head plates in the Archer® array will typically be about 3 to 4 mm away from the surface of the substrate, compared with the typical 1.5 mm of other print heads—so greatly reducing the risk of 'head strike', which can damage these expensive components. Moreover, by using this technology, also the risk of damaging the transfer paper is reduced. With this technology therefore relatively thin and cheap transfer paper may be used.

According to a preferred embodiment, preferably a single pass printer is used with full-width array of print heads incorporated in the printing stations using a print-bar technology comprising the steps of:
 providing a support bar having a plurality of primary mounting positions;
 providing a plurality of exchangeable print heads, in which each print head has a plurality of inkjet nozzles, and
 mounting the print heads to the support bar such that they are releasable, which process includes an alignment finishing process.

Furthermore, preferably a single pass printer is used with a full-width array of print heads designed to jet sublimation ink across a distance from the head plates of the print heads to the surface of a substrate that is at least about 3 mm. The print heads inside the printing stations are preferably of the piezoelectric drop-on-demand ink-jet type. More preferably, print heads are used that are in one line, without being staggered. More preferably, print heads of the FujiFilm Samba print head type or similar are used.

As discussed hereafter, sublimation printing is often done with 4 colors; Cyan, Magenta, Yellow and Black (CMYK). Less colors, and therefore less printing stations may be used, thus reducing the cost of the printer. Accordingly, the printer may have 2 or more, preferably 4 or more printing stations each with multiple print heads extending the width of the conveyer belt, with each printing station positioned closely behind each other. For instance, the first PIKE® printer is a 6-color machine in which each color is represented by an Archer® print bar containing 43 print heads, giving a printing width of 1850 mm. This printer has a print bar with a native resolution of 1200×1200 dpi, variable drop sizes from 2-10 pL (26 µm drop diameter) and a jetting frequency of 32 kHz or higher, which together deliver typical productivity of 40 linear meters a minutes, with a maximum of around 75 m/min. While using a modular construction, additional print bars may be installed and consequently additional colors may be used. This printer may suitably be used, wherein the ink is replaced by sublimation ink.

In the assembly, preferably a calender as heat press is present. It is placed preferably in line with the printer, to transfer the sublimation ink on to the fabric. The purpose of the transfer printing calender is to transfer and fix the sublimation inks from a transfer paper to textile with a heated drum. This sublimation process requires a regular temperature of the heated drum. Any calender may be used, provided that it provides accurately the sublimation conditions of the applied sublimation ink or inks. For instance an extended version of the Klieverik model GTC 111 or the Klieverik TC 141, capable of 1.0-11.0 m/min, may be used. Other options include a modernized version of the Stork vacuum system TC451 or the Kleinerwefers DSV 1200. Common temperatures are in the range of 170-230° C. for 30-60 seconds. Once the requested temperature is reached, sublimation takes place as the transfer paper and the fabric are brought together during their run around the heated roll.

The transfer paper is preferably transported by way of a conveyer belt, which ensures that no deformation of the paper occurs. This ensures highly accurate registration of the design to be printed (accuracy within 0.1 mm or better). Moreover, this again allows for the use of relatively thin and cheap transfer paper, making this method surprisingly economical. The transfer paper may be kept in place with an adhesive layer, electrostatically, by suction, or by any other means. Use of an adhesive layer, preferably a mild adhesive layer, more preferably a layer of a mild adhesive that becomes slightly sticky when heated above room temperature, is preferred. In this case, the belt is further provided with a heating unit. Heating of the carrier may also assist the positioning of the carrier on transport unit, as does the presence of a pressure roller. For accuracy, it is preferred that a unit (e.g., laser unit) is used to check the positioning of the carrier on the transport unit. The use of an adhesive layer is disclosed in EP1591258A1, the contents of which are included herein by reference.

The sublimation transfer printing method of the invention is particularly suitable for polyester fabrics and fabrics of polyacetal, polyamide, triacetate and acrylics. Cellulosic materials like cotton and viscose are less suitable; generally they are only weakly colored with disperse dyes. When used at a low percentage, e.g. at 20%, in a blend this can be acceptable. Chemical modification of cotton to make it printable with sublimation disperse dye is possible to some extent, but these treatments, like alkylation can damage the cotton fiber and let it lose its typical cotton properties. A pretreatment with a hydroxymethylmelamine used to be an option, but as formaldehyde is generated during the transfer in the calender, this is no longer an option under the REACh legislation.

The invention is hereafter illustrated by way of an example, wherein a polyester fabric is printed.

EXAMPLES

In the sublimation transfer printing method according to the present invention a PIKE® single pass ink jet printer or similar wide-array single pass printer is used. The method described hereafter employs a printer with a conveyer belt using an adhesive layer as support means. The method describes the transfer printing on a fabric of polyester.

A web of transfer paper (suitable for water-based ink, single use) is fed in the single pass ink jet printer from an un-winder. A dancing roller may be used to control the web speed and web tension. The paper is guided over a curved substrate heating unit and pressed with a pressure roller on the adhesive layer on the conveyer belt to fix its position (stabilizing its position). The adhesive layer on the belt is actuated by a heater, giving it just enough stickiness to avoid ripping of the paper when it is taken from the belt into the calender.

The paper is transported by the conveyer belt under transversely positioned wide array printing stations (CMYK or CMYK+2 supportive colors), equipped with drop on demand piezoelectric print heads. Here the transfer paper is ink jet printed with a single or multi colored (negative) design. The paper has been pre-treated to absorb water, so drying between the print bars is not needed. The paper may be dried after printing in-line with an infra-red or hot air dryer, but such is not required. The paper is loosened from the conveyer belt. The paper may be stored, but preferably is fed together with the fabric into an in-line calender where the dye is transferred and fixed to the fabric under high temperature and pressure. Both paper and fabric are re-winded on a roll. As an alternative, the fabric can be collected in a box, using a plaiter.

The invention claimed is:

1. A method for sublimation transfer printing comprising in sequence the continuous steps of:

feeding a web of carrier from a feed mechanism in a machine direction to a carrier transport unit of a sublimation transfer printer provided with multiple digital printing stations,
synchronizing the speed of carrier with the movement of said transport unit;
positioning carrier on said transport unit;
depositing sublimation ink or inks onto carrier whilst synchronizing the speed of carrier with the deposition of the sublimation ink or inks;
removing carrier from transport unit and passing carrier with deposited sublimation ink or inks together with a web of substrate material to be printed from a feed mechanism through a heat press at sublimation conditions,
transferring the sublimation ink or inks onto the substrate material, and
collecting the printed substrate material and used carrier from outlet,
wherein the digital printing stations extend transversally to the machine direction and cover the width of carrier.

2. The method according to claim 1, wherein single use transfer paper is used that is from 1,60 to 3,25 meters wide, with a weight varying from 35 to 115 g/m$^2$, and treated solely on the top side.

3. The method according to claim 1, wherein a water-based sublimation ink is used.

4. The method according to claim 1, wherein as substrate material a polyester fabric is used.

5. The method according to claim 1, wherein the sublimation ink is deposited by drop on demand piezoelectric printing.

6. The method according to claim 1, wherein the sublimation ink is transferred onto the fabric in a calender as heat press, operating at 170-230° C. during a transfer time of 30-60 seconds.

7. A sublimation transfer printing assembly for the method according to claim 1, comprising:

a feed mechanism by which a web of carrier is fed in a machine direction to a printer;
the printer comprising:
a carrier transport unit, controllably movable along a machine direction;
digital printing stations for the deposition of sublimation ink or inks onto the carrier;
a feed mechanism for the substrate material to be printed;
a heat press for transferring the sublimation ink or inks onto the substrate material; and
an outlet for the substrate material and used carrier,
wherein the printing stations extend transversally to the machine direction and cover the width of carrier.

8. The sublimation transfer printing assembly according to claim 7, wherein the printing stations are of the piezo-electric drop-on-demand ink-jet type.

9. The sublimation transfer printing assembly according to claim 7, comprising 2 or more printing stations.

10. The sublimation transfer printing assembly according to claim 9, comprising 4 or more printing stations.

11. The sublimation transfer printing assembly according to claim 7, comprising a single pass printer with printing stations with a full-width array of print heads therein, designed to jet sublimation ink across a distance from the head plates of the print heads to the surface of a substrate that is at least about 3 mm.

12. The sublimation transfer printing assembly according to claim 10, wherein the print heads in each printing station are positioned in one line without being staggered.

13. The sublimation transfer printing assembly according to claim 7, wherein the carrier transport unit is a conveyer belt.

14. The sublimation transfer printing assembly according to claim 13, wherein the conveyer belt is provided with an adhesive layer.

15. The sublimation transfer printing assembly according to claim 7, wherein an in-line calender is used as heat press.

16. The sublimation transfer printing assembly according to claim 7, wherein a plaiter is used as outlet.

* * * * *